US005976290A

United States Patent [19]

MacDonald et al.

[11] Patent Number: 5,976,290

[45] Date of Patent: Nov. 2, 1999

[54] APPARATUS AND METHOD FOR SEAMING CARPETS

[75] Inventors: Lea Howard MacDonald; Chris Carl Steeves, both of Kingston, Canada

[73] Assignee: Orcon Corporation, Union City, Calif.

[21] Appl. No.: 08/949,751

[22] Filed: Oct. 14, 1997

[51] Int. Cl.[6] ................................ B32B 7/08; B32B 3/00; F16B 15/02; B25C 5/02

[52] U.S. Cl. ..................... 156/92; 156/304.4; 156/304.7; 156/579; 411/460; 411/472; 411/473; 411/474; 227/120; 227/146; 227/155; 428/62; 7/103; 16/4

[58] Field of Search .......................... 156/92, 157, 304.1, 156/304.3, 304.4, 304.7, 502, 579; 411/457, 458, 460, 471, 474, 920, 473, 472; 227/120, 141, 146, 155; 428/62; 7/103; 16/4, 6; 474/255

[56] References Cited

U.S. PATENT DOCUMENTS

| | | | |
|---|---|---|---|
| 221,979 | 11/1879 | Shellenberger | 227/141 |
| 465,652 | 12/1891 | Avery | 474/255 |
| 1,329,463 | 2/1920 | Maranville | 156/92 |
| 1,868,100 | 7/1932 | Goodstein | 411/920 |
| 1,900,683 | 3/1933 | Allen | 227/146 |
| 2,069,310 | 2/1937 | Higgins | 94/3 |
| 2,142,782 | 1/1939 | Gillette | 411/474 |
| 2,552,114 | 5/1951 | Reinhard | 154/116.5 |
| 2,673,169 | 3/1954 | Finch | 154/49 |
| 2,702,383 | 2/1955 | Buechler | 227/141 |
| 2,890,145 | 6/1959 | Milnes | 154/49 |
| 3,077,812 | 2/1963 | Dietrich | 411/474 |
| 3,218,700 | 11/1965 | Klaus | 411/920 |
| 3,413,678 | 12/1968 | Krantz | 16/16 |
| 3,440,981 | 4/1969 | Marinoff | 112/7 |
| 3,457,884 | 7/1969 | Weaver | 112/7 |
| 3,499,402 | 3/1970 | Pugach et al. | 112/7 |
| 3,862,874 | 1/1975 | Hopper et al. | 161/36 |
| 3,972,768 | 8/1976 | Hill | 156/545 |
| 4,097,445 | 6/1978 | Martins et al. | 260/40 R |
| 4,150,774 | 4/1979 | Wright | 227/146 |
| 4,416,713 | 11/1983 | Brooks | 156/64 |
| 4,463,890 | 8/1984 | Ruskin | 227/146 |
| 4,581,269 | 4/1986 | Tilman | 428/62 |
| 4,749,433 | 6/1988 | Johnston et al. | 156/304.4 |
| 4,919,743 | 4/1990 | Johnston et al. | 156/304.4 |
| 5,198,300 | 3/1993 | Matthews | 428/354 |
| 5,800,664 | 9/1998 | Covert | 156/304.4 |

*Primary Examiner*—Michael W. Ball
*Assistant Examiner*—Michael A Tolin
*Attorney, Agent, or Firm*—Medlen & Carroll, LLP

[57] ABSTRACT

A novel carpet seaming method and tools for reducing or eliminating seam peaking and profiling is provided. The backing of abutting pieces of carpeting can be reinforced along their respective edges. A staple is supported on an anvil with its legs facing the carpet backing beneath the seam line while a hammer is driven onto the carpet pile and the underlying staple base. The impact of the hammer impales the carpet backing over the legs of the staple, and compresses the staple base against the anvil. The legs can then be forced towards each other to lock the staple in position. The process is repeated along the length of the seam line until a row of staples spaced apart from each other by a predetermined distance and extending from one end of a seam to the other end securely holds the abutting pieces of carpet together to form a seam. After seaming, the carpet may be stretched conventionally and secured to tack strips along the periphery of the area being carpeted.

17 Claims, 4 Drawing Sheets

APPARATUS AND METHOD FOR SEAMING CARPETS

TECHNICAL FIELD OF THE INVENTION

This invention relates generally to wall to wall carpeting installation techniques, and more particularly to a method and apparatus for carpet seaming which reduces or eliminates seam peaking and profiling.

BACKGROUND OF THE INVENTION

The installation of wall-to-wall carpeting typically involves stretching the carpet to obtain a smooth, flat installation. This generally entails installing tack strips around the perimeter of the area to be covered with carpet adjacent to the walls of the area. The carpet is then rolled out in the room, usually over some padding, cut and seamed. One side of the carpet is attached to the tack strip along one side of a room and then stretched to the other side using conventional carpet stretchers which exert hundreds of pounds of force on the carpet. This process is intended to remove any wrinkles or creases in the carpeting, resulting in a flat, safe and visually appealing carpet installation.

Three specific requirements have historically confronted the art of carpet seaming in a stretched carpet installation. First, if a process is to be utilized in conjunction with stretch carpet installation, the seam must be sufficiently durable and permanent to withstand the forces imparted in the carpet stretching process. Second, for obvious cosmetic purposes, the seam should be as close as possible to being invisible. Third, the process should be as simple and economical as possible.

Existing methods require a trade-off between these requirements. For example, creating a seam by sewing two abutting edges of adjoining carpet pieces together, as described in, e.g., U.S. Pat. Nos. 3,440,981, 3,457,884, and 3,499,402, produces a seam of high strength that is able to withstand stretching during installation, but is very costly and time-consuming to produce. If done too quickly, or by a person not sufficiently skilled, the joined edges could be improperly aligned or carpet pile caught by the thread, making the seam visible and unsightly. This has proven inimical to the efficient and economical installation of seamed carpeting.

Early attempts at avoiding the significant costs of sewing seams included the use of adhesives and special fasteners. One technique involves the use of sheet metal strips having sharp prongs which penetrate the carpet backing from the bottom side. They are most often formed from stamping through a single piece of sheet metal to form pointed metal prongs extending out to engage the underside of the carpeting transverse to a seam area. See, e.g., Reinhard, U.S. Pat. Nos. 2,552,114; Finch, 2,673,169, Milnes, 2,890,145 and Krantz, 3,413,678. The sheet metal strip from which such prongs are stamped have significant longitudinal strength traversing a seam. However, this seaming method includes a number of problems. The metal prongs cannot, alone, securely hold the carpet backing. The entire strip lies uniformly below the carpeting backing. Consequently, any force of the tension in the process of carpet stretching is transmitted in a line along the metal strips beneath the line of the carpet backing. This tension can give rise to carpet peaking. One solution is to glue or affix the metal strip to the floor (see, e.g., Krantz, U.S. Pat. No. 3,413,678); however, a glue down process is incompatible with stretched-in carpet installation. Another problem is that the prongs, whether at right angles from the metal strip or bent more sharply, are straight and cannot prevent the carpet from rising up and off. As prongs must be kept short, to prevent injury to persons walking over the seam, the problem is exacerbated. One solution is to use adhesive with the protruding prongs to glue the prongs into the carpet backing (See, e.g., Reinhard and Krantz above); however, this requires additional time and labor.

Finally, when prongs are stamped out of sheet metal or like material, the prongs are sharp not only on the point piercing the carpet backing, but also on the edges which engage the fibers of the carpet backing to hold the carpet in place. This can result in cutting of the carpet fibers and backing which surround the metal prong, resulting in the gradual loosening of the carpet seam.

Mechanical solutions, such as sewing and the use of mechanical strip fasteners, have given way in recent years to seaming using hot melt adhesive seaming tape. This method avoids the significant time and effort burdens imposed by sewing, avoids the unreliability of mechanical strip fasteners, and enables seaming to be conducted by relatively unskilled workers. In this process, a strip of tape having a layer of hot melt adhesive is centered under the seam with the layer of hot melt adhesive facing up. An iron, or other suitable implement, is used to melt the hot melt adhesive, and the carpet backing is pushed into the molten hot melt adhesive with the two edges abutting. The adhesive quickly sets, forming a permanent seam. This method is disclosed by, e.g., U.S. Pat. Nos. 3,972,768, 4,097,445, and 4,416,713. When initially introduced, this method produced satisfactory results. However, over time, as carpet mills sought to reduce the costs of manufacturing and changed the structure of carpet backings, hot melt carpet seaming produced two major problems: seam peaking and profiling.

Seam "peaking" is a common problem in stretched carpet installation. See, e.g., U.S. Pat. No. 4,919,743 (Johnson et al., 1990). Seam peaking occurs when the abutting edges of the carpet at a seam form a relatively sharp ridge. Seam peak ridges are unsightly and typically result in excessive wear at the seam. Seam peaking may result from the use of excessive heat during seam sealing, or from the tension which is put on the carpet during stretching. Johnson '743 and U.S. Pat. No. 4,749,433 (Johnson et al., 1988) disclose the use of enhanced width seaming tape. However, such tape is expensive to use and may not eliminate entirely the peaking problem.

Many efforts have been made to combat seam peaking, including the enhanced width tape disclosed by Johnson, as well as tapes having steel rods, bars or wires which are placed transversely to the seam line. These solutions do not work in every instance, with all kinds of carpets. Indeed, some of the most expensive carpets, such as Berber carpets, continue to exhibit peaking even after the above methods have been used to prevent peaking.

Seam "profiling" is another problem which is encountered in stretched carpet installations. Profiling occurs where the carpet surface which is directly over the seaming tape bulges during or following stretching to produce a longitudinal mound along the seam which is typically as wide as the seaming tape which is used. Thus, if an installer uses a wider tape, such as a 6" tape, to combat seam peaking, the seam peaking may be avoided, but the installer ends up with a "profile" which is typically about 6" wide all along the seam. The cause of profiling is not known with certainty, but it appears that the absorption of hot melt adhesive into the backing of the carpet reduces the flexibility of the backing, causing bulging when the carpet is stretched.

Accordingly, the need exists for a carpet seaming technique and apparatus that is capable of producing a strong reliable permanent seam, able to substantially reduce or avoid peaking, profiling and other unacceptable cosmetic anomalies, and be reasonably inexpensive, quick and easy to use.

SUMMARY OF THE INVENTION

The present invention provides a method and an apparatus for seaming carpets in a manner that will eliminate or reduce carpet peaking and profiling.

In one embodiment, the present invention provides a method of forming a seam in abutting pieces of carpeting by means of inserting a row of staples regularly spaced along the length of the seam, with each individual staple traversing the seam. The separate carpet pieces are unrolled face up, oriented essentially in the position they will remain after the installation is completed. The carpet edges abutting the seam line are then folded back, and a stapler inserted beneath them against the flooring. The carpet edges are then folded back to their original position, thereby covering the lower portion of the staple gun. The staples are inserted from the underside of the carpeting, penetrating up into the carpet backing. This method is particularly useful as a substitute for hot melt seaming, which often gives rise to peaking and profiling, particularly in stretched carpet installations.

The area of the carpet backing to be stapled can additionally be reinforced with a polypropylene mesh or other conventional reinforcing means prior to the insertion of staples. Carpet backings often entail a relatively sparse weave, and the tension exerted by each staple on individual fibers of the backing has the potential to tear or loosen the backing at the seam. Reinforcing the carpet backing along the edges being joined can substantially reduce the deleterious effects of staple seaming on the unreinforced backing. Latex or pressure sensitive adhesive may be advantageously used alone, or for applying tightly knit reinforcing fabrics such as polypropylene mesh, or loose fibers, to the carpet backing.

In another embodiment, the present invention discloses staples which are particularly suited for carpet seaming. The preferred staple is a flat-based staple. An alternative staple includes a raised section on the base of the staple, and "U" shaped legs. The impact of a against the base induces an inward rotation of the legs before they have passed entirely through the carpet backing and into the carpeting pile. Such a characteristic can be used advantageously in carpet seaming in that it prevents staples from passing into the pile and hooking fibers of piling under the ends of the staple.

In yet another embodiment, a staple gun to be used in the carpet seaming process is disclosed. The staple gun includes a hammer, an anvil, a frame for aligning the hammer with the anvil, a magazine for holding a plurality of staples, a switch means for actuating the staple gun, and a feed mechanism for advancing a new staple into the ready position after each activation of the staple gun. The anvil portion of the staple gun supports the base of the staple as the hammer strikes the carpet pile and base of the staple. As the carpet backing is forced by the impulse of the hammer over the legs of the staple, the legs of the staple are driven towards each other. More preferably, secondary hammers are provided for impacting the legs of the staples to securely crimp the legs of the staples against the base, forming tight metal loops securely fastened around the fibers of the carpet backing.

Other and further objects, features, advantages and embodiments of the present invention will become apparent to one skilled in the art from reading the Detailed Description of the Invention together with the drawings.

DETAILED DESCRIPTION OF THE INVENTION

Figure 1:
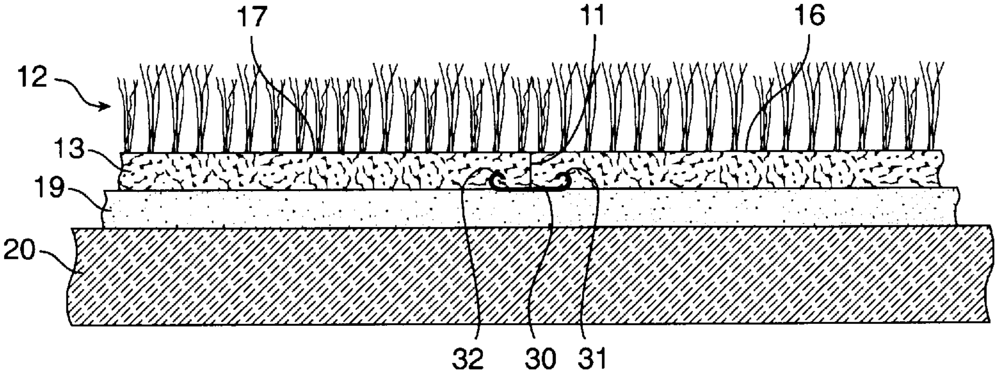
FIG. 1 is a cross section of a carpet seam created using a method of the present invention.

As shown in FIG. 1, a carpet seam is formed from two abutting carpet pieces 16 and 17, each of which consists of carpet loops or pile 12 and a backing 13. A carpet installation in which such a seam is formed typically includes a cushion 19 interposed between carpet pieces 16 and 17 and the floor surface 20.

Carpet pile is the surface portion of the carpet that is visible following installation of wall to wall carpets. A wide range of synthetic and natural fibers ranging from nylon to wool have been used to produce carpet pile. The most prominent features of the pile are the color and texture. Those skilled in the art are familiar with the wide variety of textures, including plush, loop, and sculptured pile. Various colored patterns and designs can be woven into the pile, and in such cases, the carpet installer must be careful to line up and match the various patterns when forming a seam in order to give the finished appearance that the carpeting that has been laid is one continuous piece of carpeting. Separate pieces being seamed may therefore have to he aligned in a specific orientation with respect to each other to insure uniformity of texture. Because carpeting pile is generally composed of fibers vertically woven or looped back and forth through carpet backing 13, there is typically little or no transverse strength imparted to a carpet through the pile.

Carpet backing 13 typically includes one or more layers of woven fabric or scrim for supporting the pile. The backing forms the medium in which the pile yarn is anchored, and provides transverse cohesiveness and strength to the carpeting. Carpet backings conventionally consist of a single layer 13, as shown in FIG. 1, or, as shown in FIG. 2, multiple layers such as a primary 14 and secondary 15 backing. The fabric used in the secondary or outermost portion of the backing is typically comprised of fairly large and course fibers. Either or both backings may include an adhesive or a binder for locking the pile in place and increasing the strength of the backing.

Figure 4A:
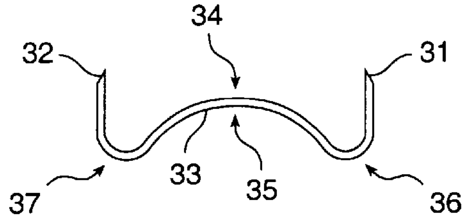
FIGS. 4A, 4B and 4C show a front view of three embodiments of a preformed wire staple of the present invention.
Figure 4C:
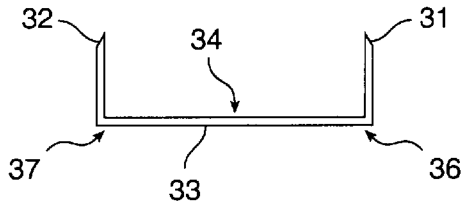
Figure 5:
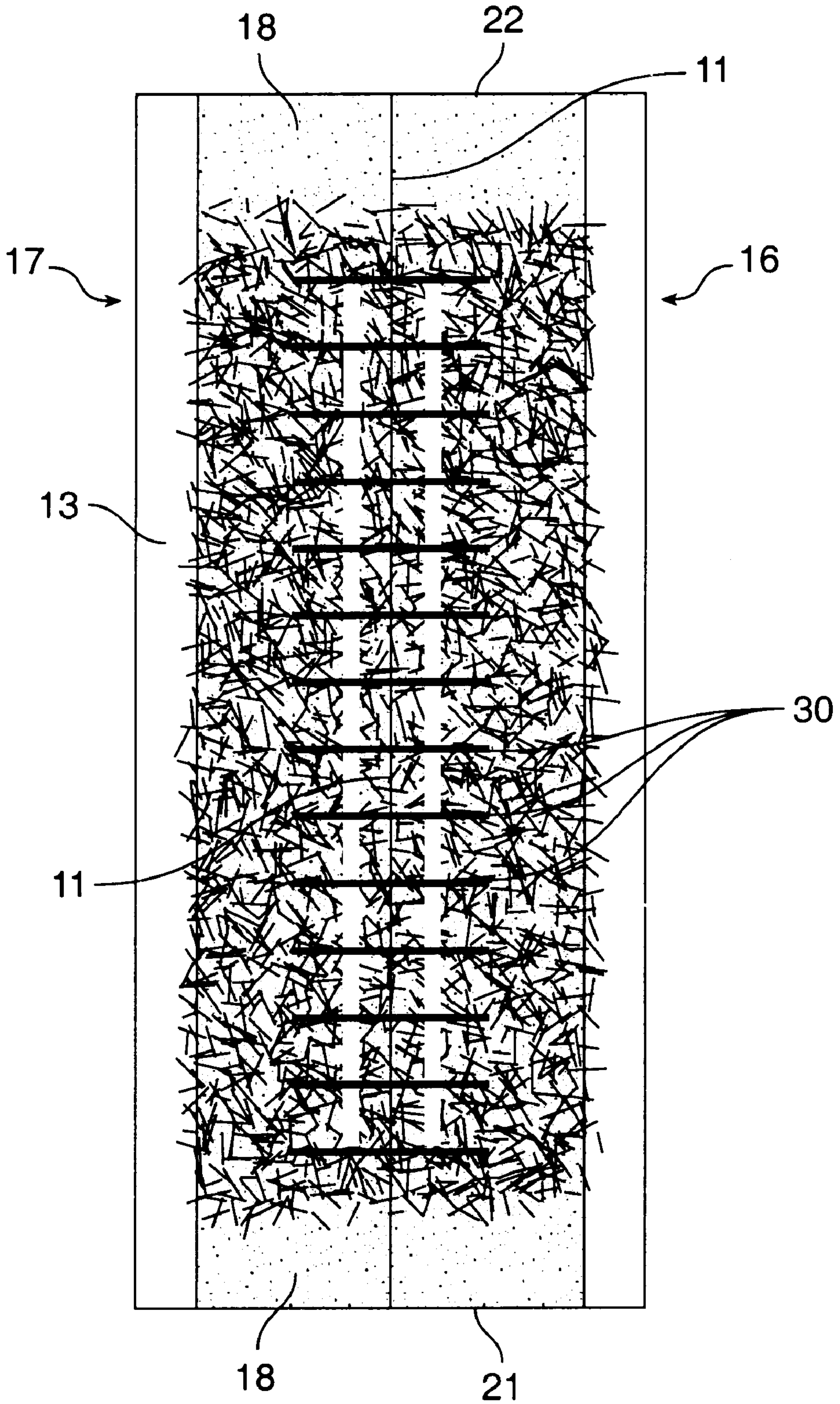
FIG. 5 is a bottom view of carpeting seamed in accordance with the present invention.

As shown in FIGS. 1 and 5, a carpet seam can be created using a plurality of staples 30. A staple 30 of the present invention, examples of which are illustrated in FIGS. 4A, B, and C, includes a base 33, a first leg 31 having a sharp end extending generally perpendicularly from a first end 36 of base 33, and a second leg 32 having a sharp end extending generally perpendicularly from a second end 37 of base 33. Staple 30 can be formed from any durable, malleable material, and is preferably formed from steel wire having a rectangular cross-section. As shown in FIGS. 4A and B, first end 36 and first leg 31, and second end 37 and second leg 32 can be formed into a “U” shape. The base 33 can be formed with an arch or raised portion as shown, so that a sudden blow to the top surface 34 of base 33 will flatten the base 33, and cause the pointed ends of legs 32 and 31 to rotate towards each other. Alternatively, and more preferably, a standard right-angle type staple, as shown in FIG. 4C can be used. As will be appreciated, when staples 30 are positioned with the top surface 34 of base 33 transverse to and bridging the abutting edges of carpet pieces 16 and 17, and the points of first leg 31 and second leg 32 against the carpet backing, a blow to the top surface of the carpeting will force the carpet backing down onto the points of first leg 31 and second leg 32, causing the staple to penetrate the carpet backing. Where the arched or raised base type staple shown in FIGS. 4A and B are used, the blow will compress the arch or raised portion, causing the pointed ends of first leg 31 and second leg 32 to rotate towards each other. Where a flat base type staple is used, the pointed ends of first leg 31 and second leg 32 can be driven towards each other by the force of a secondary blow, or by capturing the ends 31, 32 on an angled surface, such as surface 52, 52' shown in FIG. 2C, to bend the ends 31, 32 towards each other, followed by the blow of secondary hammer 46. The hook thus formed between each leg of the staple 30 and the base 33 holds the abutting carpet pieces in a seamed relationship.

The legs 31, 32 are sized to enable them to penetrate the carpet backing just prior to forming the hook. This prevents the staple 30 from snagging and stapling carpet pile. For the purposes of this invention, we have found a leg approximately ⅛ inch to ¼ inch in length performs satisfactorily. However, a somewhat longer or shorter leg might be more desirable depending upon the thickness of the backing of the carpet to be seamed.

The other dimensions of staple 30 will be dictated by the type of carpet, the force expected to be used to stretch the carpet, and the spacing between the staples. Because normal foot traffic can impart significant force on staples within a carpet seam, and the force conventionally imparted during carpet stretching can reach, for example, 800–1,000 pounds, the staple must not only be malleable enough to be bent into shape, but strong enough in combination with the other staples in the seam to retain its new shape against anticipated rigors of installation and usage. We have found, for example, that a staple formed from typical staple material such as, for example, carbon steel, having a thickness of 0.020 inches and a width of 0.050 inches performs satisfactorily and provides a high enough modulus of elasticity to overcome the bending moment created by typical surface tension as a result of the stretching of the carpet after seaming. The optimal spacing between such staples for forming a stable seam is preferably 0.25 inches; however, spacing may vary from a minimum of about 0.0625 inches up to a maximum of about 0.50 inches. Other staple dimensions can be used, and spacing between such staples will vary depending upon the strength of the staple used. For example, it is possible to have a staple having a thickness of 0.015 inches and a width of 0.030 inches. The spacing between such staples would preferably be 0.0125 inches.

The process of installing carpeting according to the present invention preferably begins with laying down a cushion or substrate 19 on the floor surface as shown in FIG. 1. Cushion 19 is typically used to reduce carpet wear and to increase the comfort of walking across the carpeted surface. The backing of the carpeting may thus rest upon this intermediate substrate, or directly against the floor 20. As used herein, the term “flooring” includes the floor itself, along with any cushion or other surface to which the carpeting may be attached.

The carpet installation begins by fitting and trimming the carpet pieces to conform to the size and shape of the room being carpeted. The separate carpet pieces are then seamed. As discussed, careful attention may be necessary for orienting the carpet portions being seamed with respect to nap, texture and patterns. While the carpeting may be turned upside down so the backing faces upward during the seaming process, “face seaming,” in which carpet is seamed in position, is preferred. The staples of the present invention may be used with either seaming technique. Two pieces of carpeting to be seamed are abutted firmly against each other. A staple 30 is positioned with its base 33 perpendicular to the seam line and bridging the abutting edges of the carpet pieces with the pointed end of leg 31 facing the carpet backing 13 of carpet piece 16, and the pointed end of leg 32 facing the carpet backing 13 of carpet piece 17 as shown in FIG. 2. A blow is imparted into the carpeting directly above the top surface of the staple base 34 through the carpet forcing the carpet backing down over the pointed end of the legs 31, 32, which are subsequently driven towards each other after penetrating the backing to secure the abutting relationship of the two carpet pieces. A second staple is positioned a predetermined distance from the first, and used to fasten the two carpet pieces in an identical manner. The process continues until the entire length of the seam has been secured with staples. The plurality of staples is seen in FIG. 5 to extend generally along the entire seam 11 from the first end 21 to the second end 22 of the seam 11. After seaming, the carpet can be conventionally stretched and anchored to tack or tackless strips along the periphery of the room. The benefit of this new seaming method is immediately observed during stretching: since no hot melt adhesive is applied to the carpet backing to form the seam, seam peaking and profiling do not occur, or are substantially reduced.

Figure 2A:
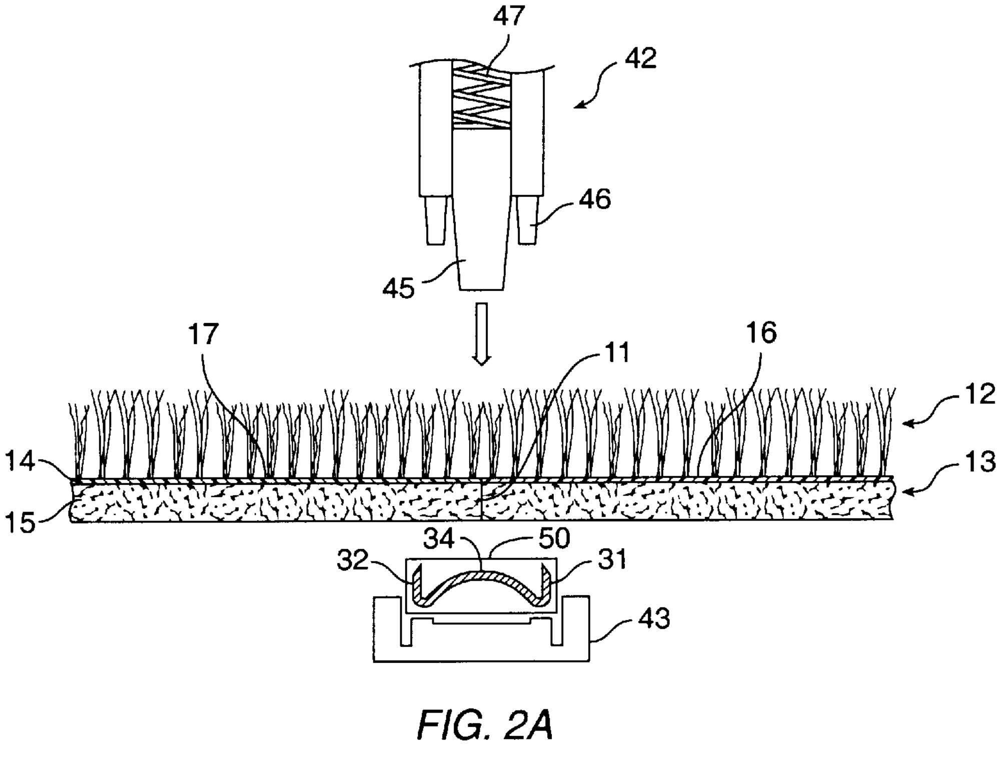
FIGS. 2A, 2B, and 2C provide cross sectional views illustrating three embodiments of a staple gun of the present invention positioning a staple to form a seam.
Figure 2B:
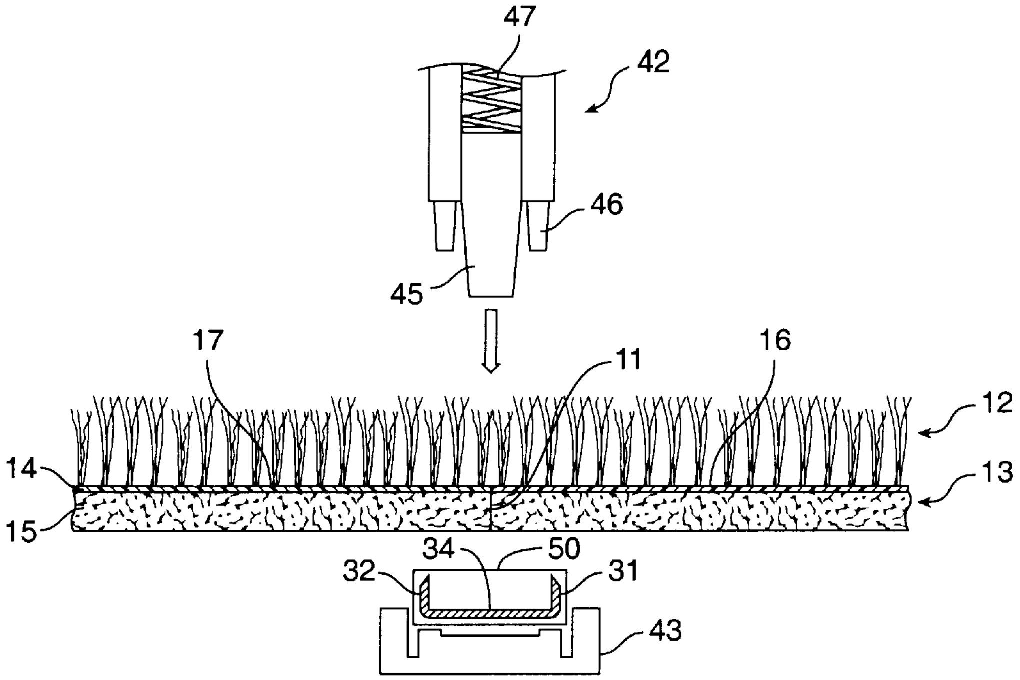
Figure 2C:
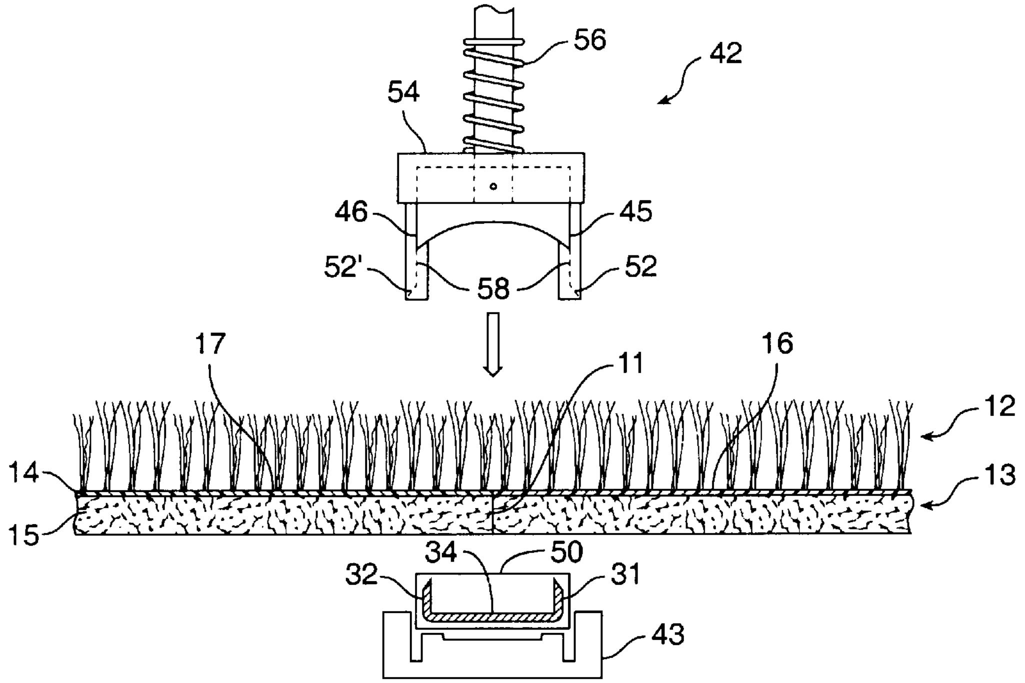
Figure 3:
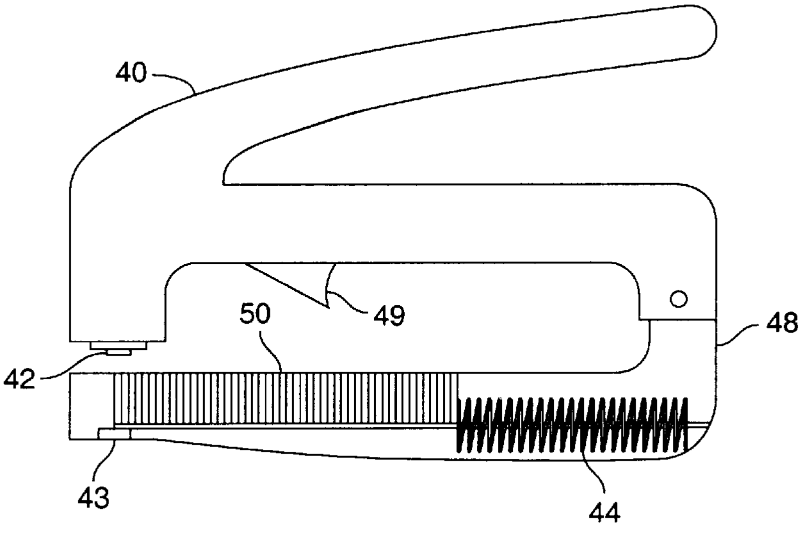
FIG. 3 is a side view of a staple gun of the present invention.

FIGS. 2A, 2B, 2C and 3 depict a staple gun of the present invention which can be used for positioning and securing staples to form a seam in a face seaming operation. The staple gun depicted in FIG. 2C is most preferred. The staple gun includes a hammer means 42 and an anvil 43. Hammer means 42 can be a single hammer of conventional design powered by any conventional means, such as, for example, spring compression, electromagnetic means, or electric motor. Most preferably, as shown in FIG. 2C, hammer means 42 is formed from a head 54 having two downwardly depending, spaced apart primary hammers 45. Angled surfaces 52, 52', which most preferably form about a 45 degree angle with the outer surface of the primary hammers, are provided on the end of each of the two primary hammers 45, for engaging the staple ends 31, 32 and driving them towards each other as the hammers 45 compress the carpet backing 14 over the staple. One or more secondary hammers 46 can be provided as shown in FIGS. 2A through 2C for striking ends 31, 32 of the staples to drive them towards each other and base 33 after the primary hammer 45 has struck the top surface 34 of the carpet backing 14 and forced the carpet backing over the sharp ends 31, 32 of the staple and caused the sharp ends 31, 32 to penetrate the backing of the carpet and move towards each other. As shown in FIG. 2C, the secondary hammer 46 is most preferably a forming blade mounted for sliding movement in a track 58 provided on the inside surface of each of the primary hammers 45. Spring 56 prevents the secondary hammer 46 from moving until the staple ends 31, 32 have been received by the angled surfaces 52, 52' forced towards each other, extending into the track 58, where they will be engaged by the secondary hammer 46.

Anvil 43 can be a hard flat surface, or, more preferably, can provide slightly raised platforms for supporting the ends 36, 37 of a staple. The staple gun can be provided with a conventional frame 48 for aligning the hammer means 42 and the anvil 43, a switch mechanism 49 for actuating the stroke of the hammer, a magazine 50 for holding multiple staples, and a feed mechanism 44 for advancing a new staple into the ready position over the anvil 43 after stapling. In the preferred embodiment, the frame 40 can be provided with an ultra thin guide strut 48, a narrowed portion of the frame at the rear of the staple gun which connects the top and bottom portions of the stapler. Strut 48 is preferably thin enough to fit between the abutting edges of the carpet pieces being seamed in such a way as to avoid or minimize the separation between the carpeting pieces along the seam during the stapling process.

To operate a stapling gun such as that depicted in FIGS. 2A, 2B, 2C and 3, the bottom portion of the stapler (housing the magazine 32 and the anvil 43) is placed on the flooring beneath the carpet backing, the abutting edges of which rest against strut 48. This automatically positions the hammer 42 immediately over the seam line, and positions a staple over the anvil with the base perpendicular to and bridging the seam so that each leg of the staple will secure one carpet piece. Upon actuation of the switch means 49, the hammer means 42, being aligned with the anvil 43 and a readied staple 30, descends, into the carpeting pile 12.

For the embodiment shown in FIG. 2A, the force of the hammer 45 against the carpet backing impales the carpet backing on the ends 31, 32 of the staple, and flattens the base 33 of the staple against the anvil 43. The force deforming the staple's base is transmitted outward toward the ends of the staple 36, 37, causing the legs 31, 32 to rotate up towards each other. When the bottom surface of the staple base 35 is compressed against the anvil 43, the advancing hammer stops. If secondary hammers 46 are provided the force imparted by the secondary hammers forces the staple legs toward each other and flattens the staple legs against the flattened base, providing a more secure attachment to the carpet backing.

For the embodiment shown in FIG. 2B, the force of the hammer 45 against the carpet backing impales the carpet backing over the ends 31, 32 of the staple, compressing the carpet backing over the ends 31, 32 of the staple. When the bottom surface of the staple base 35 is compressed against the anvil 43, the advancing hammer stops. The secondary hammers 46, then descend, engage the ends 31, 32 which are just protruding through the backing 14, and flattens the staple legs against the flattened base, providing a secure attachment to the carpet backing.

For the embodiment shown in FIG. 2C, the force of the primary hammers 45 against the carpet backing impales the carpet backing over the ends 31, 32 of the staple, compressing the carpet backing over the ends 31, 32 of the staple. The ends 31, 32 are engaged by the angled surfaces 52, 52' as they emerge from the carpet backing 14, and are forced towards each other as they travel along the angled surfaces and into the track 58. As the ends 31, 32 move into the track 58, the secondary hammer 46 descends, engaging the ends 31, 32, and driving them towards each other and against the base, providing a secure attachment to the carpet backing.

After this insertion of the staple is completed, the hammer means preferably and conventionally automatically retracts or returns to a "ready" position so that the stapling process can be repeated as desired. A magazine capable of holding a plurality of staples can allow this stapling process to be repeated in rapid succession until the magazine requires reloading.

As previously discussed, following the insertion of a staple, the installer moves the entire staple gun back along the line of the seam a predetermined incremental amount, and inserts another staple. This process is repeated until the seam is completed by stapling from one end of a seam to the other end.

After the carpet has been seamed, the final installation process of wall to wall carpeting most commonly involves stretching. In stretched carpeting installations, one edge of the carpet is typically anchored onto tacks or a tackless strip along one side of the room. Carpet stretching tools then may be inserted into the carpet, exerting hundreds of pounds of tension across select portions of the carpet surface. This serves to remove the various wrinkles and irregularities in the surface of the carpet. When stretching is performed across a seam, the seam must be strong enough to withstand the forces imparted through this technique. Following the stretching process, the remaining edges of the carpet are similarly tacked down along the various walls. The stapled seaming process disclosed herein can also be used with glue down installations.

Figure 4B:
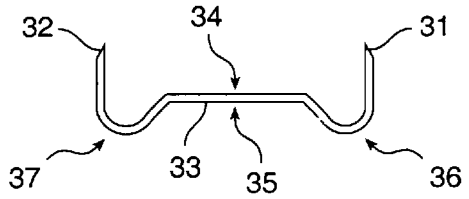

FIGS. 4A, 4B, and 4C illustrate three examples of a staple useful in performing the seaming process disclosed herein. In traditional stapling operations, before the legs of a staple can be curved inward to grip the material being stapled, the staple must completely penetrate the object being stapled and protrude from the far end of that object. From there, the legs come in contact with a curved staple guide which bends the legs of the staple into a loop, securely fastening the staple to the material being stapled. If this typical stapling method were, however, utilized in a carpet seaming application, the staples would be crimped not only around the fibers of the backing 13, but around the pile fibers 12, creating a visible and unsightly seam when viewed from above. As one means of circumventing this problem, our seaming process advantageously utilizes a staple with legs having a length sufficient to just penetrate the carpet backing before they rotate (or are driven) inward towards each other, without the need for a curved staple guide. Accordingly, the staple legs move towards each other as they emerge from the backing, and avoid interference with the pile.

As shown in FIG. 5, reinforcing material can optionally and advantageously be added to the backing of each carpet piece along the edge, to reinforce the fibers of the backing, and prevent the staples from pulling fibers loose during stretching. The addition of such reinforcement is most preferable when the carpeting being seamed has a single or insubstantial backing which may otherwise be damaged or incapable of holding a stapled seam during stretching. However, reinforcement of the seam area may not be necessary where the carpets being seamed using this method have substantial backings.

Such reinforcement can be provided by polypropylene mesh, some other conventional reinforcing substance (e.g., cloth strips, adhesive and loose fibers), or by simply applying a layer of adhesive (such as, for example, epoxy, acryllic, or latex adhesive) along the abutting edge of each carpet piece forming the seam..

When reinforcing is desirable, a reinforcing strip 18 is preferably used, and may be affixed to the carpet backing 13 along each abutting edge of the seam prior to the insertion of the staples using an adhesive. Latex, or pressure sensitive adhesive is preferred for this purpose due to their elasticity. Epoxy or acryllic adhesive may also be used, as may hot melt adhesive; however, hot melt is not preferred because its application to carpet backings is believed to contribute to seam peaking and profiling, even when it is not being used to secure the two abutting edges of a seam together. The reinforcing increases the strength of the backing against which the staples 30 may pull when stapled into the backing, and should be very helpful in maintaining backing integrity in carpets with only a single backing. In the best mode of this reinforcing technique, one (1) strip of polypropylene mesh is affixed to each separate piece of carpeting prior to seaming, along the edge being seamed. By reinforcing the carpeting pieces individually in this manner, they remain separate pieces until seamed by the stapling method of the present invention. Accordingly, reinforcing strips used in this manner are completely compatible with face seaming, and do not alter or interfere with the process of face seaming as described herein.

One skilled in the art will recognize at once that it would be possible to construct the present invention from a variety of materials and in a variety of different ways. While the preferred embodiments have been described in detail, and shown in the accompanying drawings, it will be evident that various further modification are possible without departing from the scope of the invention as set forth in the appended claims.

What is claimed is:

1. A method for forming a seam between two abutting pieces of carpeting, each piece of carpeting having a backing side, a pile side, and an edge having a first end and a second end, said seam formed using a plurality of staples each of which have a first leg disposed on one end of a base, and a second leg disposed on an opposite end of said base, said method consisting essentially of the steps of:

(a) orienting the two carpeting pieces so that the two edges of the carpeting pieces abut each other;

(b) inserting a staple through the backing side of the carpeting pieces at the first end of the abutting edges so that the first leg of said staple penetrates and secures the backing of a first piece of carpeting, the second leg of said staple penetrates and secures the backing of a second piece of carpeting, and the seam is bridged by the base of the staple;

(c) inserting another staple through the backing side of the carpeting pieces as provided in (b) between the previous staple and the second end of the edge at a predetermined distance from the previous staple;

(d) repeating step (c) until the second end of the edge has been secured with a staple.

2. The method of claim 1 additionally comprising the step of reinforcing the backing along said edge of each carpet piece to prevent the staples from pulling out of the backing.

3. The method of claim 2 wherein said step of reinforcing the backing along said edge of each carpet piece comprises interposing a reinforcing material between the backing side and the staples.

4. The method of claim 3 wherein said reinforcing material is glued to the backing side along the edge of each piece of carpeting prior to seaming with staples.

5. The method of claim 3 wherein said reinforcing material is polypropylene mesh.

6. A method for installing wall-to-wall carpeting in which at least two pieces of carpet, each of which have a pile surface, a backing surface, and an edge, are placed together with their edges abutting and seamed together along the abutting edges using a plurality of staples having a base of sufficient length to span the abutting edges, a first leg formed at a first end of said base, and a second leg formed at a second end of said base, said method comprising the steps of:

(a) orienting the two carpeting pieces so that pile side of both pieces face the same direction and the two edges of the carpeting pieces abut each other to form a seam line;

(b) positioning a first staple beneath the backing side of the carpeting pieces at a first end of the abutting edges so that the first leg of said staple abuts the backing of a first piece of carpeting, the second leg of said staple abuts the backing of a second piece of carpeting, with the base of the staple resting against an anvil and transversely bridging said seam line;

(c) striking the pile surface of the carpeting pieces over the staple to force the first and second leg through the backing of the first and second pieces of carpeting and to incline the first and second legs towards each other;

(d) repeating steps (b) and (c) at a predetermined distance from the previous staple;

(e) repeating step (d) until the second end of the edge has been secured with a staple; and, (e) stretching and anchoring the seamed carpet over a surface to be carpeted.

7. The method of claim 6 wherein each part of each staple is formed of steel of substantially uniform width, thickness and cross-section.

8. The method of claim 6 additionally comprising the step of reinforcing the backing along said edge of each carpet piece to prevent the staples from pulling the backing loose along the edge of the carpet pieces as the carpet is stretched.

9. The method of claim 8 wherein said step of reinforcing the backing along said edge of each carpet piece comprises interposing a reinforcing material between the backing side and the staples.

10. The method of claim 9 wherein said reinforcing material is glued to the backing side along the edge of each piece of carpeting prior to seaming with staples, whereby said staple leg will pass through the reinforcing material before passing through said backing.

11. The method of claim 10 wherein said reinforcing material is polypropylene mesh.

12. The method of claim 6 wherein the step of orienting the carpet pieces includes orienting the carpet pieces so that backing side rests upon a surface to be carpeted.

13. The method of claim 12 wherein said surface to be carpeted includes a conventional carpet cushion.

14. A carpet seaming staple gun for face seaming of wall-to-wall carpets comprising:

a means disposed beneath a seaming area of carpet to be seamed for feeding a plurality of staples one at a time to a firing position, each of said staples having a base with a bottom surface, a top surface, a first end and a second end, an upstanding, sharpened first leg formed at said first end and extending generally transversely from said top surface of said base, an upstanding, sharpened second leg formed at said second end and extending generally transversely from said top surface of said base, each said leg disposed to swing towards the other leg when a force is applied to said staple during seaming, said means for feeding including an anvil at said firing position for supporting at least a portion of said bottom surface of said base;

a conventionally powered hammer means, disposed above a seaming area of a carpet to be seamed, for striking a surface of the carpet over said legs, forcing said base against said anvil and causing said legs of a staple at the firing position to be inclined towards each other as they are simultaneously driven through a backing of said carpet to be seamed;

a frame for aligning said hammer means with said means for feeding; and, a switch means for actuating said hammer means.

15. The carpet seaming staple gun of claim 14 wherein said hammer means includes a primary hammer for initially inclining the legs of said staple towards each other, and at least one secondary hammer for subsequently striking both legs to force said legs of said staple towards said staple base.

16. The carpet seaming staple gun of claim 15 wherein said primary hammer is automatically retractable after striking a staple.

17. A carpet installation having one or more seams formed between a first carpet piece abutting a second carpet piece, each said seam formed using only a plurality of staples, each staple having a base positioned substantially perpendicular to and bridging said seam, a first leg mounted at one end of said base for engaging said first carpet piece, and a second leg mounted at an opposite end of said base for engaging said second carpet piece.

* * * * *